(12) United States Patent
Mo et al.

(10) Patent No.: US 11,726,003 B2
(45) Date of Patent: Aug. 15, 2023

(54) TEST PLATFORM FOR AUTOMATIC FLUSHING VALVE

(71) Applicant: CHINA INSTITUTE OF WATER RESOURCES &HYDROPOWER RE, Beijing (CN)

(72) Inventors: Yan Mo, Beijing (CN); Jiandong Wang, Beijing (CN); Yanqun Zhang, Beijing (CN); Qiaoling Li, Beijing (CN); Shihong Gong, Beijing (CN); Xiaoyan Gao, Beijing (CN)

(73) Assignee: CHINA INSTITUTE OF WATER RESOURCES AND HYDROPOWER RESEARCH, Beijing (CN)

( * ) Notice: Subject to any disclaimer, the term of this patent is extended or adjusted under 35 U.S.C. 154(b) by 0 days.

(21) Appl. No.: 18/060,507

(22) Filed: Nov. 30, 2022

(65) Prior Publication Data

US 2023/0168147 A1    Jun. 1, 2023

(30) Foreign Application Priority Data

Nov. 30, 2021 (CN) .......................... 202111445753.X

(51) Int. Cl.
*G01M 99/00* (2011.01)
*G01M 13/003* (2019.01)
(52) U.S. Cl.
CPC .................. *G01M 13/003* (2019.01)
(58) Field of Classification Search
CPC .............................................. G01M 99/008
See application file for complete search history.

(56) References Cited

U.S. PATENT DOCUMENTS

| 5,921,270 A | 7/1999 | McCarty |
| 10,251,348 B2 * | 4/2019 | Bermudez Rodriguez ................. A01G 25/16 |
| 2008/0087749 A1 | 4/2008 | Ruskin et al. |

FOREIGN PATENT DOCUMENTS

| CN | 1477382 A | 2/2004 |
| CN | 101256120 A | 9/2008 |

(Continued)

OTHER PUBLICATIONS

English translation of CN-102288396-A (Year: 2011).*

(Continued)

*Primary Examiner* — Alexander A Mercado
(74) *Attorney, Agent, or Firm* — Cherskov Flaynik & Gurda, LLC

(57) ABSTRACT

A test platform for an automatic flushing valve is described. It includes a fluid source, weighing parts, a bracket, a diverter and several driplines. The driplines are parallel to each other and are evenly arranged in an array in a circumferential direction of the diverter. Emitters are installed on each of the driplines; one end of each driplines is fixed to the diverter, which is connected to the fluid source to feed fluid into the driplines. The diverter is pivotally connected to the bracket, so that the diverter and the driplines can pivot relative to the bracket; the other end of each driplines is used to install automatic flushing valves. Weighing parts are installed below the automatic flushing valves to measure the solution flowing out of the automatic flushing valves, and other weighing parts are installed below the driplines to measure solution flowing out of the emitters.

10 Claims, 3 Drawing Sheets

(56) References Cited

FOREIGN PATENT DOCUMENTS

| | | | |
|---|---|---|---|
| CN | 101451925 A | | 6/2009 |
| CN | 102288396 A | * | 12/2011 |
| CN | 102288396 A | | 12/2011 |
| CN | 202177408 U | | 3/2012 |
| CN | 204064628 U | | 12/2014 |
| CN | 106076986 A | | 11/2016 |
| CN | 106813914 B | | 6/2017 |
| CN | 206804296 U | | 12/2017 |
| CN | 207259904 U | | 4/2018 |
| CN | 207379774 U | | 5/2018 |
| CN | 109060329 A | | 12/2018 |
| CN | 211649142 U | | 10/2020 |
| CN | 212538388 U | | 2/2021 |
| CN | 114018568 A | | 2/2022 |
| WO | 2016176991 A1 | | 11/2016 |

OTHER PUBLICATIONS

Xinkai Zhao "Hydraulic Performance of Automatic Flushing Valve at the End of Dripline" Published in Journal of Irrigation and Drainage 40(7), pp. 105-112 on Jul. 2021.

* cited by examiner

TEST PLATFORM FOR AUTOMATIC FLUSHING VALVE

The present application claim priority to Chinese Application Serial Number 202111445753.X, filed on Nov. 30, 2021, presently pending, the contents of which are hereby incorporated by reference.

TECHNICAL FIELD

The present disclosure relates to the technical field of experimental apparatuses, in particular, to a test platform for the automatic flushing valve.

BACKGROUND

Drip irrigation is an irrigation method in which water and nutrients required by crops are evenly and slowly dripped into the soil in a root zone of the crops in the form of water droplets through a piping system and emitters installed on driplines according to crop water requirements. It has the advantages of water saving, fertilizer saving, labor saving, etc., is one of the most efficient irrigation technologies in the field of water-saving irrigation today.

During the operation of a drip irrigation system, part of the sediment, organic matter, or small suspended particles such as microorganisms and chemical sediments in a water source can pass through a filter and enter the drip irrigation system, causing an emitter to be blocked. With the increasing shortage of water resources in our country, drip irrigation water sources are diversified and complicated, and unconventional irrigation water sources such as high-sediment water have been widely promoted and applied, but this may increase the risk of emitter clogging. One of the ways to relieve clogging of the emitter is to perform regular dripline flushing; automatic flushing valves at the ends of driplines allow regular flushing of the drip irrigation system. For example, after automatic flushing valves introduced in the patent application "Flushing Valve and Drip Irrigation Apparatus" with the application number 202020231599.0 are installed at the ends of the driplines, it may implement: when the drip irrigation system is in operation, the driplines are flushed, blockage in the driplines is discharged out of the system, and after flushing for a period of time, the drip irrigation system automatically shuts down, which may significantly improve an anti-clogging performance of emitters, and improve irrigation uniformity and service life of the drip irrigation system.

A hydraulic performance test is the most direct and effective method to test the working performance of the emitters of the drip irrigation system. In recent years, scholars have carried out a lot of research work on the performance test of the emitter and also developed corresponding test systems, such as the invention patent "A comprehensive test apparatus and method for the performance of the emitter of an underground high-efficiency irrigation system" with the patent No. ZL201110121453.6 and the invention patent "A comprehensive test apparatus and method for the performance of the emitter of an underground high-efficiency irrigation system" with the patent No. ZL201710030554.X. In order to speed up test efficiency, the above test apparatuses include multi-layer driplines arranged in layers from top to bottom. When the hydraulic performance test is carried out with sandy water, the biggest problem is: under the influence of gravity and connecting elbows and valves of layers, the amount and gradation of sediment entering the driplines is very uneven, and there are significant errors in test results of the driplines.

Automatic flushing valve is a new type of drip irrigation system supporting equipment, which is mainly used in high-sediment water sources. At present, all apparatuses cannot test the hydraulic performance of the automatic flushing valve, nor can they accurately evaluate an improvement effect of the automatic flushing valve on the anti-clogging performance of emitters under sandy water conditions. The invention of a test platform for the automatic flushing valve is imminent.

SUMMARY

The purpose of the present disclosure is to provide a test platform for the automatic flushing valve in view of the fact that the existing test apparatuses cannot test the hydraulic performance of the automatic flushing valve and evaluate the improvement effect of the automatic flushing valve on the anti-clogging performance of emitters.

To achieve the above purpose, the present disclosure adopts the following technical solution:

One aspect of the present disclosure provides a test platform for the automatic flushing valve, including: a fluid source, first weighing parts, second weighing parts, a bracket, a diverter and several driplines, the driplines are parallel to each other and the driplines are evenly arranged in an array in a circumferential direction of the diverter, and emitters are installed on each of the driplines; one ends of the driplines are fixed to the diverter, the diverter is connected to the fluid source to feed fluid into the driplines through the diverter, the diverter is pivotally connected to the bracket, so that the diverter and the driplines can pivot relative to the bracket; the other ends of the driplines are used to install automatic flushing valves; and several of the first weighing parts are used to be installed below the automatic flushing valves to monitor a mass of a solution flowing out of the automatic flushing valves, and several of the second weighing parts are installed below the driplines to monitor a mass of a solution flowing out of the emitters.

Alternatively, the test platform for the automatic flushing valve further includes: a plurality of emitter flow collection buckets, the emitter flow collection buckets are installed below the driplines, and the emitter flow collection buckets are configured to collect the solution flowing out of the emitters. Weight sensors for communication connection with a computer are installed below the emitter flow collection buckets, and the weight sensors are the second weighing parts.

Beneficial effects of this technical solution are: in this way, the mass of the solution flowing out of the emitters may be collected by the emitter flow collection buckets and the weight sensors.

Alternatively, the test platform for the automatic flushing valve further includes: an emitter flow collection cart installed below the driplines, the emitter flow collection cart can move relative to the driplines in a length direction of the driplines, the emitter flow collection buckets are placed on the top of the emitter flow collection cart, and the emitter flow collection buckets are evenly distributed in a horizontal plane.

Beneficial effects of this technical solution are: when the emitter flow collection buckets are required to collect the solution flowing out of the emitters, the emitter flow collection buckets are positioned under the corresponding emitters. When the emitter flow collection buckets are not required to collect the solution, the emitter flow collection cart is moved away, so that the positions of the emitter flow collection buckets deviate from the emitters. In this way, the solution flowing out of the emitters may not fall into the emitter flow collection buckets so as to avoid that a solution remaining in the emitter flow collection buckets may affect test results during subsequent tests.

Alternatively, a return tank is installed below the emitter flow collection cart, and a track is installed on the top of the return tank. The emitter flow collection cart is movable on the track. A water return hole is formed on the emitter flow collection cart, which runs through the emitter flow collection cart in a vertical direction, so that a solution flowing out of the emitters into the emitter flow collection cart but not into the emitter flow collection buckets can flow into the return tank through the water return hole.

Beneficial effects of this technical solution are: in the embodiments of the present disclosure, the emitter flow collection cart is provided with a roller, and the roller cooperates with the track to realize the movement of the emitter flow collection cart relative to the return tank. The return tank is an open structure so that water flowing into the water return hole can flow into the return tank from the water return hole.

Alternatively, the test platform for the automatic flushing valve further includes: a horizontal centrifugal pump and a return tank, the return tank is configured to receive the solution flowing out of the emitters, the fluid source includes a water storage tank, the water storage tank and the return tank are connected through the horizontal centrifugal pump to feed a solution in the return tank into the water storage tank through the horizontal centrifugal pump.

Beneficial effects of this technical solution are: before a formal test, the emitter flow collection cart may be used to make the emitter flow collection buckets deviate from the positions of the emitters so that all the solution flowing out of the emitters flows into the return tank through the water return hole. When the solution in the return tank accumulates to a certain amount, for example, when the water level of the solution reaches about half of the volume of the return tank, turn on the horizontal centrifugal pump, and feed the solution in the return tank into the water storage tank through the horizontal centrifugal pump to circulate the solution, especially sediment in the solution can be cyclically used, avoiding the problem that the sediment in the water storage tank is all sent to the return tank, and there is no sediment or a sediment concentration drops during subsequent tests. In this way, the uniformity of sediment during the test is improved, and it is closer to the actual conditions of the drip irrigation project with the water from the Yellow River in China.

Alternatively, the test platform for the automatic flushing valve further includes: a water replenishment solution tank, a sand replenishment solution tank and a mixer, the mixer is installed in the water storage tank to stir a solution in the water storage tank, and both the sand replenishment solution tank and the water replenishment solution tank are communicated with the water storage tank.

Beneficial effects of this technical solution are: the sand replenishment solution tank is filled with a sediment solution with a specific concentration, and the water replenishment solution tank is filled with clean water. The sand replenishment solution tank may replenish sand into the water storage tank, the water replenishment solution tank may replenish water into the water storage tank, and the mixer may stir the solution in the water storage tank evenly.

Alternatively, the sand replenishment solution tank and the water storage tank are connected through a sand replenishment pipeline, the water replenishment solution tank and the water storage tank are connected through a water replenishment pipeline, the water replenishment pipeline and the sand replenishment pipeline are respectively equipped with a water replenishment solenoid valve and a sand replenishment solenoid valve, and both the water replenishment solenoid valve and the sand replenishment solenoid valve are electrically connected to a computer.

Alternatively, the test platform for the automatic flushing valve further includes a layered turbidity meter connected in communication with a computer, and the layered turbidity meter is fixedly installed on an inner wall of the water storage tank to monitor the sediment concentration of each layer in the water storage tank in real-time.

Beneficial effects of this technical solution are: the sand replenishment pipeline and the water replenishment pipeline are respectively equipped with the sand replenishment solenoid valve and the water replenishment solenoid valve, the two solenoid valves are electrically connected to the computer, and a data communication module and a control instruction template are provided inside the solenoid valves. Based on a sediment concentration value of each layer set by the test and monitored by the layered turbidity meter in real-time, the computer may control the sand replenishment solenoid valve and the water replenishment solenoid valve and the mixer to realize the sand replenishment and water replenishment and stirring of the water storage tank, to ensure that during the test in the water storage tank, the sediment concentration of each layer remained unchanged and uniform.

Alternatively, the test platform for the automatic flushing valve further includes a timer connected in communication with a computer, and the first weighing parts are weighting sensors connected in communication with the computer.

Beneficial effects of this technical solution are: when a value read by the weighting sensor changes considerably (that is, greater than a certain threshold), the computer controls the timer to start timing, when the value read by the weighting sensor changes slightly (i.e., less than a certain threshold), the computer controls the timer to stop timing. The timer value is a flush duration of the automatic flushing valve. The computer is connected to the weighting sensors and the timer, and may read data of the weighting sensors and the timer, so as to obtain three hydraulic performance indicators of the automatic flushing valve, namely, the flush duration, a flush water volume and a flush flow rate.

Alternatively, the test platform for the automatic flushing valve further includes a connecting rod and a first support ring; the connecting rod is arranged parallel to the driplines, the driplines are evenly distributed around the connecting rod, the first support ring is sleeved and fixed on the connecting rod, the driplines are fixed to the connecting rod through the first support ring, and one end of the connecting rod is fixedly connected to a center point of the diverter.

Beneficial effects of this technical solution are: this makes the diverter, the connecting rod, the first support ring, and the driplines connected as a whole, which may rotate synchronously with the diverter.

Alternatively, the bracket further includes a second support ring, valve loaders, and a support rod; the number of the valve loaders is the same as the number of the automatic flushing valves, the second support ring is sleeved on the connecting rod, the valve loaders are installed on the second support ring, and the valve loaders are evenly distributed in a circumferential direction of the second support ring, the valve loaders are used to sleeve on the automatic flushing valves in one-to-one correspondence, and a pipeline for feeding a solution to several of the first weighing parts is installed on the valve loaders.

Beneficial effects of this technical solution are: the solution flowing out of each automatic flushing valve may be fed to the corresponding first weighing part through the corresponding valve loader.

Alternatively, the bracket further includes a second support ring, a support rod, valve loaders and liquid collection bottles, the number of the valve loaders is the same as the number of the automatic flushing valves, the second support ring is sleeved on the connecting rod, the valve loaders are installed on the second support ring, and the valve loaders are evenly distributed in a circumferential direction of the second support ring, the valve loaders are used to sleeve on the automatic flushing valves in one-to-one correspondence, and the liquid collection bottle is installed on each of the valve loaders.

Alternatively, the first weighing part is installed in the liquid collection bottle to monitor a flush water volume and a flush duration; and/or, a sound sensor is installed on the second support ring, and the sound sensor is connected in communication with the computer to monitor and record a start time point and an end time point of a water spray sound when the automatic flushing valve flushes, then calculate a flush duration.

The technical solution provided by the present disclosure may achieve the following beneficial effects:

The test platform for the automatic flushing valve provided by the present disclosure can simultaneously test the hydraulic performance of several automatic flushing valves and monitor the effect of the automatic flushing valves on the anti-clogging performance of the emitters on the driplines. More significantly, by enabling the diverter, the driplines, and the automatic flushing valves to pivot at a constant speed relative to the bracket, the number and gradation of sediment particles in the solution can flow into the driplines more uniformly and with a similar probability, improving an accuracy of hydraulic performance test results of the automatic flushing valves and the emitters on the driplines.

Additional technical features and advantages of the present disclosure will be more apparent in the following description or may be learned through the specific practice of the present disclosure.

BRIEF DESCRIPTION OF THE DRAWINGS

In order to illustrate the technical solution of specific embodiments of the present disclosure more clearly, the accompanying drawings required in the description of the specific embodiments will be briefly introduced below. Obviously, the accompanying drawings in the following description are some embodiments of the present disclosure; other accompanying drawings may also be obtained based on these accompanying drawings by those of ordinary skill in the art without creative efforts.

REFERENCE NUMERALS

1—Sand replenishment solution tank;
2—Water replenishment solution tank;
3—Sand replenishment solenoid valve;
4—Water replenishment solenoid valve;
5—Mixer;
6—Electric box;
7—Belt;
8—Pulley;
9—Diverter;
10—Dripline;
11—First support ring;
12—Valve loader;
13—Support rod;
14—Emitter flow collection bucket;
15—Water return hole;
16—Platform frame;
17—Return tank;
18—Constant speed motor;
19—Vertical centrifugal pump;
20—Water storage tank;
21—Computer;
22—Second support ring;
23—PE hose or liquid collection bottle;
24—Emitter flow collection cart;
25—Connecting rod;
26—Automatic flushing valve;
27—Layered turbidity meter;
28—Central tube;
29—Radiant tube;
30—Horizontal centrifugal pump;
31—Main pipeline;
32—Hollow bearing;
33—Bracket;
34—Bearing.

DETAILED DESCRIPTION OF EMBODIMENTS

The technical solution of the present disclosure will be clearly and completely described below with reference to the accompanying drawings. Obviously, the described embodiments are a part of the embodiments of the present disclosure, but not all of the embodiments. Based on the embodiments in the present disclosure, all other embodiments obtained by those of ordinary skill in the art without creative efforts shall fall within the protection scope of the present disclosure.

In the description of the present disclosure, it should be noted that the orientation or positional relationship indicated by the terms "center", "upper", "lower", "left", "right", "vertical", "horizontal", "inner", "outer", etc. is based on the orientation or positional relationship shown in the accompanying drawings, which is only for the convenience of describing the present disclosure and simplifying the description, rather than indicating or implying that the apparatus or element referred to must have a particular orientation, be constructed and operated in a particular orientation, and therefore should not be construed as a limitation on the present disclosure. Furthermore, the terms "first", "second", and "third" are used for descriptive purposes only and should not be construed to indicate or imply relative importance.

In the description of the present disclosure, it should be noted that, unless otherwise expressly specified and limited, the terms "installed", "linked" or "connected" should be understood in a broad sense; for example, it may be a fixed connection or a detachable connection, or an integral connection; it may be a mechanical connection or an electrical connection; it may be a direct connection, or an indirect connection through an intermediate medium, or an internal connection between two elements. For those of ordinary skill in the art, specific meanings of the above terms in the present disclosure may be understood in specific situations.

Figure 1:
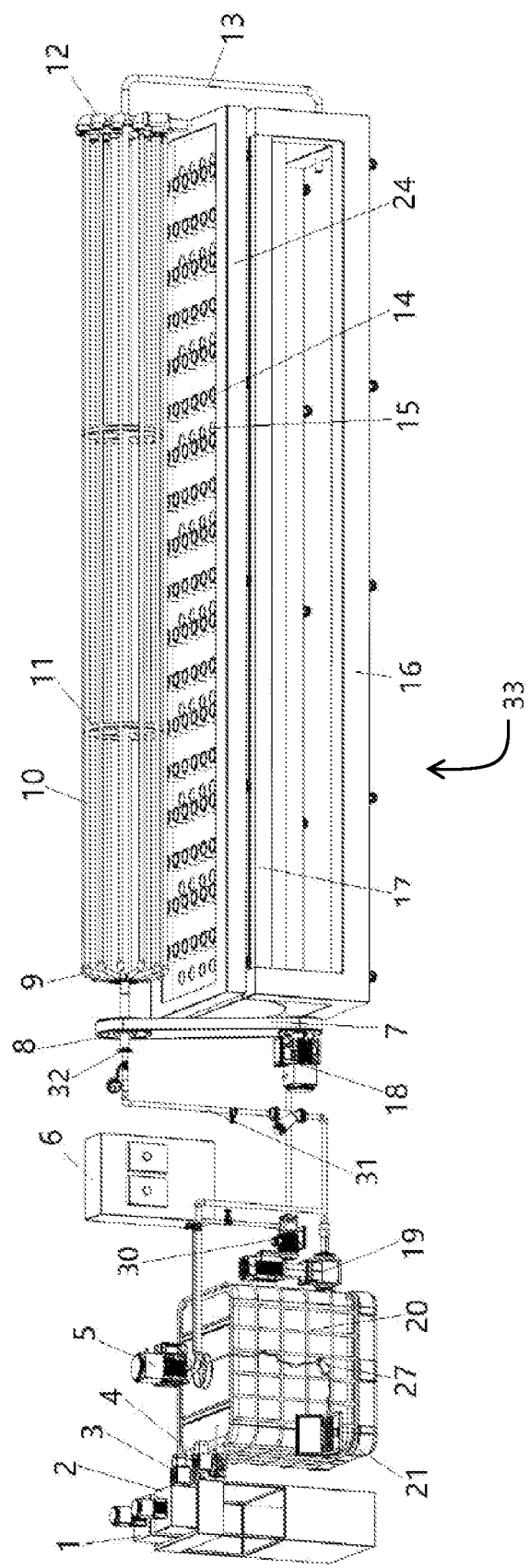
FIG. 1 is a schematic three-dimensional structural diagram of an embodiment of a test platform for the automatic flushing valve provided in an embodiment of the present disclosure.
Figure 2:
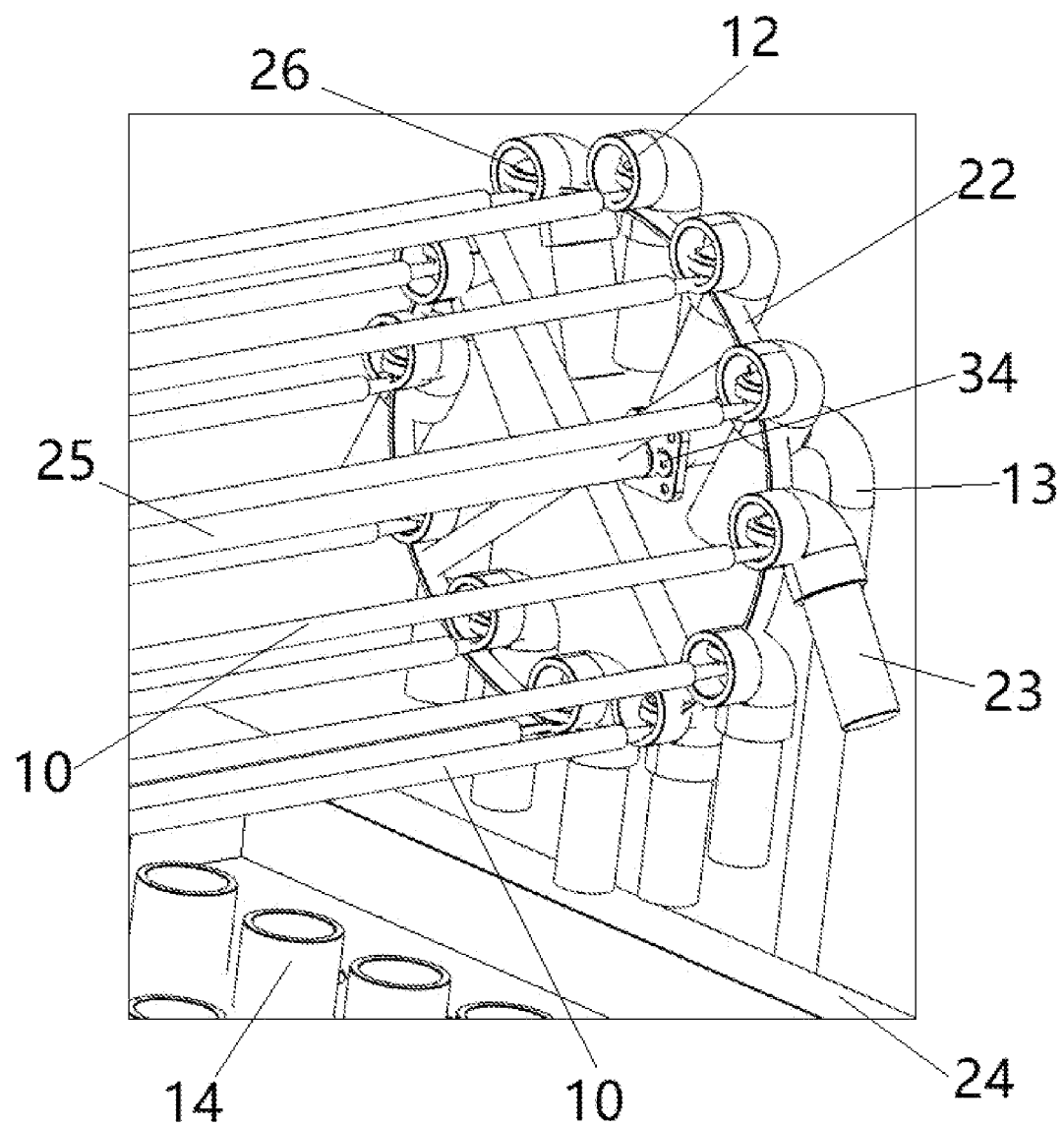
FIG. 2 is a schematic partial structure diagram of an embodiment of the test platform for the automatic flushing valve provided in an embodiment of the present disclosure.

As shown in FIGS. 1 and 2, one aspect of the present disclosure provides a test platform for the automatic flushing valve, including: a fluid source, first weighing parts, second weighing parts, a bracket 33, a diverter 9 and several driplines 10, the driplines 10 is parallel to each other and the driplines 10 are evenly arranged in an array in a circumferential direction of the diverter 9, and emitters are installed on each of the driplines 10; one ends of the driplines 10 are fixed to the diverter 9, the diverter 9 is connected to the fluid source to feed fluid into the driplines 10 through the diverter 9, the diverter 9 is pivotally connected to the bracket 33, so that the diverter 9 and the driplines 10 can pivot relative to the bracket 33; the other ends of the driplines 10 are used to install automatic flushing valves 26; and several of the first weighing parts are used to be installed below the automatic flushing valves 26 to monitor a mass of a solution flowing out of the automatic flushing valves 26, and several of the second weighing parts are installed below the driplines 10 to monitor a mass of a solution flowing out of the emitters.

Figure 3:
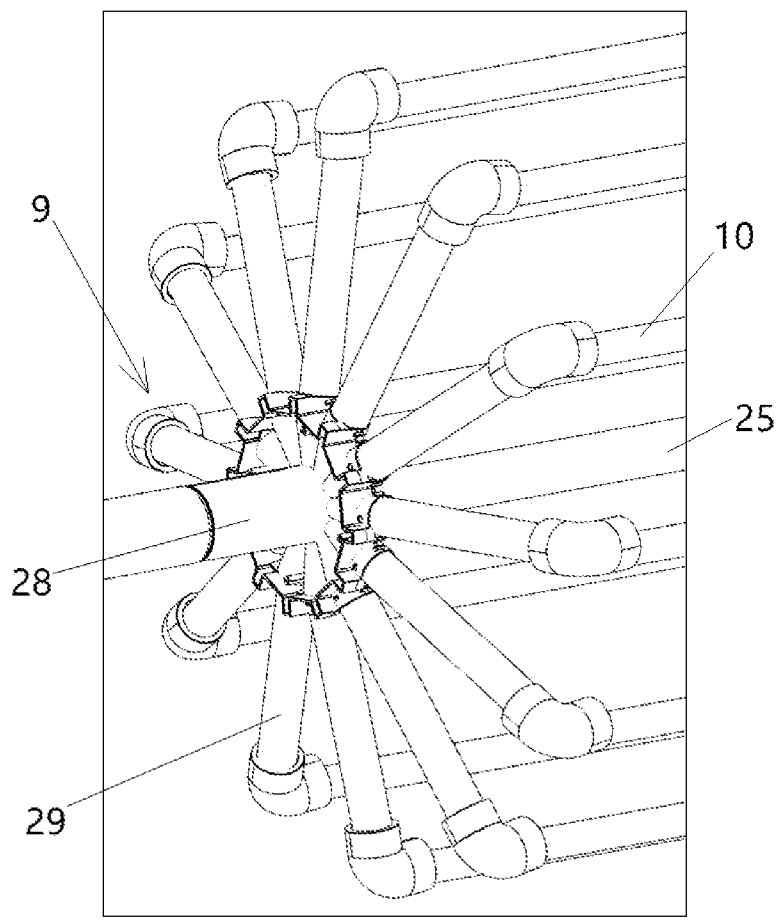
FIG. 3 is a schematic partial structure diagram of an embodiment of the test platform for the automatic flushing valve provided in an embodiment of the present disclosure.

In an embodiment of the present disclosure, the bracket 33 may be a pipe connected to the diverter 9, the bracket 33 may also be a frame set in addition to the pipe, and the bracket 33 may also be a structure including both the diverter 9 and the pipe communicating with the diverter 9; as shown in FIG. 3, the diverter 9 may be a structure of a plurality of radiant pipes 29 branched from a central pipe 28, an inlet of each of the radiant pipes 29 is communicated with the central pipe 28, an outlet of each of the radiant pipes 29 is communicated with an inlet of each of the driplines 10 in one-to-one correspondence, and the central pipe 28 connects the fluid source with the inlets of the radiant pipes 29; each dripline 10 is provided with a plurality of emitters.

In the test platform for the automatic flushing valve provided in an embodiment of the present disclosure, the driplines 10 are set horizontally during use, the ends of some driplines may be connected to the automatic flushing valves 26 in one-to-one correspondence, and the remaining driplines are not equipped with the automatic flushing valves 26 as a control treatment. The diverter 9 is connected to the fluid source, which may be used to supply a solution containing sediment. The solution enters the driplines 10, and flows out of the automatic flushing valves 26 into the corresponding several first weighing parts, until the automatic flushing valves 26 automatically close, and the solution no longer flows out of the automatic flushing valves 26. At the same time, the solution may also flow out through the emitters and flow into several of the second weighing parts. Combined with a timer, the weight of the solution is obtained by the first weighing parts, which may be used to calculate three key hydraulic performance indicators of the automatic flushing valves 26, namely a flush water volume, a flush duration and a flush flow rate, and may also calculate a difference in hydraulic performance between several simultaneously measured flush values, and used to evaluate manufacturing errors of the flush values. A weight of the solution is obtained by the second weighing parts, which may be used to calculate a water outlet flow and irrigation uniformity of several emitters, quantitatively representing an effect of the automatic flushing valves 26 on improving the anti-clogging performance of the emitters. The greater the mass of the solution obtained by the first weighing parts, the greater the flush duration of the automatic flushing valves 26 and the more thorough the flushing of the driplines. Compared with the control treatment without installing the automatic flushing valves 26, the greater the mass of the solution obtained by the second weighing parts, the more significant the effect of the automatic flushing valves 26 on improving the anti-clogging performance of the emitters.

The test platform for the automatic flushing valve provided by the present disclosure can simultaneously test the hydraulic performance of several automatic flushing valves 26, and monitor the effect of the automatic flushing valves 26 on the anti-blocking performance of the emitters on the driplines 10. More significantly, by enabling the diverter 9, the driplines 10, and the automatic flushing valves 26 to pivot at a constant speed relative to the bracket 33, the number and gradation of sediment particles in the solution can flow into the driplines 10 more uniformly and with a similar probability, improving the equivalence of test conditions obtained for each sample, and improving an accuracy of hydraulic performance test results of the automatic flushing valves 26 and the emitters on the driplines 10.

Alternatively, the test platform for the automatic flushing valve provided in an embodiment of the present disclosure further includes: a plurality of emitter flow collection buckets 14, the emitter flow collection buckets 14 are installed below the driplines 10, and the emitter flow collection buckets 14 are configured to collect the solution flowing out of the emitters. Weight sensors for communication connection with a computer are installed below the emitter flow collection buckets 14, and the weight sensors are the second weighing parts. In this way, the mass of the solution flowing out of the emitters may be collected by the emitter flow collection buckets 14 and the weight sensors. In an embodiment of the present disclosure, the second weighing parts may also be scale-type weighing parts such as electronic scales capable of direct reading.

Alternatively, the test platform for the automatic flushing valve provided in an embodiment of the present disclosure further includes: an emitter flow collection cart 24 installed below the driplines 10, the emitter flow collection cart 24 can move relative to the driplines 10 in a length direction of the driplines 10, the emitter flow collection buckets 14 are placed on the top of the emitter flow collection cart 24, and the emitter flow collection buckets 14 are evenly distributed in a horizontal plane. When the emitter flow collection buckets 14 are required to collect the solution flowing out of the emitters, the emitter flow collection cart 24 is moved so that the emitter flow collection buckets 14 are positioned under the corresponding emitters. When the emitter flow collection buckets 14 are not required to collect the solution, the emitter flow collection cart 24 is moved away, so that the positions of the emitter flow collection buckets 14 deviate from the emitters. In this way, the solution flowing out of the emitters may not fall into the emitter flow collection buckets 14, so as to avoid any remaining solution in the emitter flow collection buckets 14, which may affect test results during subsequent tests.

Alternatively, a return tank 17 is installed below the emitter flow collection cart 24, and a track is installed on the top of the return tank 17. The emitter flow collection cart 24 is movably matched with the track. A water return hole 15 is formed on the emitter flow collection cart 24, which runs through the emitter flow collection cart 24 in a vertical direction so that a solution flows out of the emitters into the emitter flow collection cart 24 but not into the emitter flow collection buckets 14 can flow into the return tank 17 through the water return hole 15. In an embodiment of the present disclosure, the emitter flow collection cart 24 is provided with a roller, and the roller cooperates with the track to realize the movement of the emitter flow collection cart 24 relative to the return tank 17. The return tank 17 is an open structure, so that water flowing into the water return hole 15 can flow into the return tank 17 from the water return hole 15.

Alternatively, the test platform for the automatic flushing valve provided in an embodiment of the present disclosure further includes: a horizontal centrifugal pump 30 and a return tank 17, the return tank 17 is configured to receive the solution flowing out of the emitters, the fluid source includes a water storage tank 20, the water storage tank 20 and the return tank 17 are connected through the horizontal centrifugal pump 30 to feed a solution in the return tank 17 into the water storage tank 20 through the horizontal centrifugal pump 30. Before a formal test, the emitter flow collection cart 24 may be used to make the emitter flow collection buckets 14 deviate from the positions of the emitters so that all the solution flowing out of the emitters flows into the return tank 17 through the water return hole 15. When the solution in the return tank 17 accumulates to a certain amount, for example, when the water level of the solution reaches about half of the volume of the return tank 17, turn on the horizontal centrifugal pump 30, and feed the solution in the return tank 17 into the water storage tank 20 through the horizontal centrifugal pump 30 to circulate the solution, especially sediment in the solution can be cyclically used, avoiding the problem that the sediment in the water storage tank 20 is all sent to the return tank 17, and there is no sediment or a sediment concentration drops during subsequent tests. In this way, the uniformity of sediment during the test is improved, and it is closer to the actual conditions of the drip irrigation project with the water from the Yellow River in China.

In an embodiment of the present disclosure, preferably, the emitter flow collection cart 24 is electrically connected to an electric box 6, and the electric box 6 controls the movement of the emitter flow collection cart 24; the water storage tank 20 may feed the solution in the water storage tank 20 to the diverter 9 through a vertical centrifugal pump 19, and parts such as a pressure regulating gate valve, a pressure dividing gate valve, a ball valve and a pressure gauge are installed on a pipeline connecting between the water storage tank 20 and the return tank 17, in order to realize functions such as the switch of solution flow, adjustment of solution pressure and flow rate, and monitoring of pipeline pressure value. In an embodiment of the present disclosure, the bracket 33 may include a platform frame 16, and the return tank 17 may be fixed on the platform frame 16.

Alternatively, the test platform for the automatic flushing valve provided in an embodiment of the present disclosure further includes: a sand replenishment solution tank 1, a water replenishment solution tank 2, and a mixer 5, the mixer 5 is installed in the water storage tank 20 to stir the solution in the water storage tank 20, and both the sand replenishment solution tank 1 and the water replenishment solution tank 2 are communicated with the water storage tank 20. The sand replenishment solution tank 1 is filled with a sediment solution with a certain concentration, and the water replenishment solution tank 2 is filled with clean water. The sand replenishment solution tank 1 may replenish sand into the water storage tank 20, the water replenishment solution tank 2 may replenish water into the water storage tank 20, and mixer 5 may stir the solution in the water storage tank 20 evenly.

Alternatively, the test platform for the automatic flushing valve provided in an embodiment of the present disclosure further includes a layered turbidity meter 27 connected in communication with a computer 21, and the layered turbidity meter 27 is fixedly installed on an inner wall of the water storage tank 20 to monitor a sediment concentration of each layer in the water storage tank 20 in real-time. The sand replenishment solution tank 1 and the water storage tank 20 are connected through a sand replenishment pipeline, the water replenishment solution tank 2 and the water storage tank 20 are connected through a water replenishment pipeline, the sand replenishment pipeline and the water replenishment pipeline are respectively equipped with a sand replenishment solenoid valve 3 and a water replenishment solenoid valve 4, both the sand replenishment solenoid valve 3 and the water replenishment solenoid valve 4 are electrically connected to the computer 21, and a data communication module and a control instruction template are provided inside the solenoid valves. Based on a sediment concentration value of each layer set by the test and monitored by the layered turbidity meter 27 in real-time, the computer 21 may control the sand replenishment solenoid valve 3 and the water replenishment solenoid valve 4 and the mixer 5 to realize the sand replenishment and water replenishment and stirring of the water storage tank 20, to ensure that during the test in the water storage tank 20, the sediment concentration of each layer remains stable at design value and is evenly distributed.

Alternatively, the test platform for the automatic flushing valve provided in an embodiment of the present disclosure further includes: a timer connected in communication with the computer 21, and the first weighing parts are weighting sensors connected in communication with the computer 21. When a value read by the weighting sensor changes greatly (that is, greater than a certain threshold), the computer 21 controls the timer to start timing, when the value read by the weighting sensor changes slightly (i.e., less than a certain threshold), the computer 21 controls the timer to stop timing. The timer value is a flush duration of the automatic flushing valve 26. The computer 21 is connected to the weighting sensors and the timer, and may read data from the weighting sensors and the timer, so as to obtain three hydraulic performance indicators of the automatic flushing valve 26, namely, the flush duration, the flush water volume, and the flush flow rate.

Alternatively, the test platform for the automatic flushing valve provided in an embodiment of the present disclosure further includes: a connecting rod 25 and a first support ring 11, the connecting rod 25 is arranged parallel to the driplines 10, the driplines 10 are evenly distributed around the connecting rod 25, the first support ring 11 is sleeved and fixed on the connecting rod 25, the driplines 10 are fixed to the connecting rod 25 through several of the first support rings 11, to ensure that the driplines 10 are arranged horizontally and without bending during operation, and one end of the connecting rod 25 is fixedly connected to a center point of the diverter 9. This makes the diverter 9, the connecting rod 25, several of the first support rings 11, and the driplines connected as a whole, which may rotate synchronously with the diverter 9. In an embodiment of the present disclosure, preferably, a constant speed motor 18, a belt 7 and a pulley 8 are used to drive the diverter 9 and the connecting rod 25, several of the first support rings 11 and the driplines 10 to rotate at a constant speed, the diverter 9 and a main pipeline 31 are connected by a hollow bearing 32 to realize the rotation of the diverter 9 relative to the main pipeline 31, at the same time, also realize solution communication between the diverter 9 and the main pipeline 31 and the water storage tank 20; the number of the first support ring 11 may be one or multiple, preferably multiple. The number of the first support ring 11 is related to a length of the driplines 10. When the length of the driplines 10 is relatively large, a larger number of first support rings 11 may be provided correspondingly, when the length of the driplines 10 is relatively small, the number of the first support ring 11 may be correspondingly reduced.

Alternatively, the bracket 33 further includes a second support ring 22, valve loaders 12, and a support rod 13, the number of the valve loaders 12 is the same as the number of the automatic flushing valves 26, and the second support ring 22 is sleeved on the connecting rod 25, the valve loaders 12 are installed on the second support ring 22, and the valve loaders 12 are evenly distributed in a circumferential direction of the second support ring 22, the valve loaders 12 are used to sleeve on the automatic flushing valves 26 in one-to-one correspondence, and a pipeline for feeding a solution to several of the first weighing parts is installed on the valve loaders 12, which allows the solution flowing out of each automatic flushing valve 26 to be fed to the corresponding first weighing part through the corresponding valve loader 12.

In an embodiment of the present disclosure, the pipeline on the valve loaders 12 is preferably a PE hose 23; the support rod 13 is preferably fixed on the platform frame 16, and the support rod 13 and the connecting rod 25 are connected by a bearing 34; a port of the valve loaders 12 is greater than a diameter of the automatic flushing valves 26, and a depth of the valve loaders 12 is greater than an overall length of the automatic flushing valves 26, so that the solution flushed out by the automatic flushing valves 26 may be completely collected by the valve loaders. In the present embodiment, the second support ring 22 and the connecting rod 25 are in clearance fit, and the second support ring 22 may move relative to the connecting rod 25 in a length direction of the connecting rod 25. After flushing, the valve loaders 12 can move relative to the driplines 10 in the length direction of the driplines 10, then, when the driplines 10, the connecting rod 25, and the automatic flushing valves 26 continue to rotate, the valve loaders 12 may be separated from the automatic flushing valves 26, so that the collected flush solution may be weighed and analyzed. In another implementation of the embodiment of the present disclosure, the bracket 33 further includes a second support ring 22, valve loaders 12, liquid collection bottles 23, and a support rod 13. The number of the valve loaders 12 and the liquid collection bottles 23 is the same as the number of the automatic flushing valves 26, the valve loaders 12 are installed on the second support ring 22, and the valve loaders 12 are evenly distributed in a circumferential direction of the second support ring 22, the valve loaders 12 are configured to sleeve on the automatic flushing valves in one-to-one correspondence, and the liquid collection bottles 23 are installed on the valve loaders 12. Since the second support ring 22 and the connecting rod 25 are fixedly connected, the second support ring 22 and the valve loaders 12 may rotate synchronously with the connecting rod 25. Alternatively, the first weighing part is installed in the liquid collection bottle 23 to monitor a flush water volume and a flush duration; and/or, a sound sensor is installed on the second support ring 22, and the sound sensor is connected in communication with the computer to monitor and record a start time point and an end time point of a water spray sound when the automatic flushing valve 26 flushes, then calculate a flush duration. In an embodiment of the present disclosure, when the PE hose 23 is replaced with the liquid collection bottle 23 and the sound sensor is used to detect the flush duration, after flushing, the liquid collection bottle 23 is removed and the first weighing part is used to weigh a mass of the liquid collection bottle 23 containing the solution, a mass of the empty liquid collection bottle 23 is subtracted from the mass of the liquid collection bottle 23 containing the solution to obtain a mass of the solution in the liquid collection bottle 23. The solution in the liquid collection bottle 23 may also be poured out and the mass of the solution may be directly weighed by the first weighing part, then a sediment content and gradation in the solution may be analyzed. In an embodiment of the present disclosure, the liquid collection bottle 23 is preferably a one-way liquid collection bottle to ensure that liquid may not overflow after entering. As long as a length of the PE hose 23 is large enough, and winding of the PE hose 23 is controlled to the degree that does not affect solution delivery during the test, the test may be performed using only the PE hose 23 and the first weighing part, instead of replacing them with the liquid collection bottle 23 and the sound sensor. In an embodiment of the present disclosure, the first weighing part may also be installed in each liquid collection bottle 23, and the liquid collection bottle 23 may be installed on the valve loader 12 through a bearing so that the first weighing part is always located below the corresponding automatic flushing valve 26 during the rotation of the valve loader 12 relative to the support rod 13. Further, the mass of the solution flowing out of the automatic flushing valve 26 may be monitored by the first weighing part to obtain the flush duration and flush water volume of the automatic flushing valve 26.

A specific operation process of the test platform for the automatic flushing valve provided in an embodiment of the present disclosure is as follows: the solution in the sand replenishment solution tank 1 and the water replenishment solution tank 2 is transported to the water storage tank 20 for stirring. The constant speed motor 18 drives the belt 7, the pulley 8, the diverter 9, the connecting rod 25, the first support ring 11, the driplines 10, the automatic flushing valves 26, the second support ring 22, the valve loaders 12 and the PE hose 23 (or the liquid collection bottles 23) to rotate at a constant speed according to a set speed. When the sediment concentration of each layer in the water storage tank 20 meets set requirements, the computer 21 controls the vertical centrifugal pump 19 to start and adjust to a set pressure. The sediment solution in the water storage tank 20 is transported to the driplines 10 through the vertical centrifugal pump 19 and the main pipeline 31 and the diverter 9, the automatic flushing valves 26 flush the driplines, the solution flushed out of the driplines passes through the valve loaders 12, and then is collected by the PE hose 23 and a corresponding container, or collected by the liquid collection bottle 23. At the same time, the computer 21 monitors the flush duration by using the first weighing part of the sound sensor. After flushing, the computer 21 controls the constant speed motor 18, the belt 7, the pulley 8, the diverter 9, the connecting rod 25, the first support ring 11, the driplines 10, the automatic flushing valves 26, the second support ring 22 and the valve loaders 12 to stop rotating, the mass of the solution in the container connected to the PE hose 23 is obtained by the first weighing part, and the sediment content and gradation in the solution is analyzed, or when the solution is collected by the liquid collection bottle 23, the liquid collection bottle 23 is removed, and the solution is weighed and the sediment content and gradation in the solution is analyzed. When measuring the flow rate in the emitters, the electric box 6 is turned on to control the emitter flow collection cart 24 to move, so that the emitter flow collection buckets 14 are positioned just below the emitters, the emitter flow collection buckets 14 collect the solution flowing out of the emitters and start timing using the timer. After the collection is completed, the timer is turned off, and the electric box 6 is turned off to make the emitter flow collection cart 24 return to an initial position, and the flow rate in the emitters may be obtained by using the second weighing part and the timer. After the measurement of the flow rate in the emitters is completed, the computer 21 controls the constant speed motor 18, the belt 7, the pulley 8, the diverter 9, the connecting rod 25, the first support ring 11, the driplines 10, the automatic flushing valves 26, the second support ring 22 and the valve loaders 12 to continue to rotate at a constant speed. The anti-clogging test on the emitters operates continuously. For example, after operating for 10 hours, the computer 21 controls the constant speed motor 18, the belt 7, the pulley 8, the diverter 9, the connecting rod 25, the first support ring 11, the driplines 10, the automatic flushing valves 26, the second support ring 22 and the valve loaders 12 to stop rotating, after measuring the flow rate in the emitters again, the first test ends. The number of tests may be set and simulated according to the number and duration of irrigation in an actual project, by comparing and analyzing the flow rate in the emitters measured in each time, the effect of the automatic flushing valves on the anti-clogging performance of the emitters on the driplines may be obtained. In an embodiment of the present disclosure, valves such as a pressure regulating gate valve, a pressure dividing gate valve, or a ball valve may be used, and these valves may all be solenoid valves, which only have the effect of opening and closing. A preset pressure value may be achieved by frequency conversion to realize pressure regulation; that is, the vertical centrifugal pump 19 may be a water pump having a frequency conversion function, and the entire platform may realize automatic control and monitoring.

Finally, it should be noted that the above embodiments are only used to illustrate the technical solution of the present disclosure rather than limiting the technical solution. Although the present disclosure has been described in detail with reference to the previous embodiments, those of ordinary skill in the art should understand that: it is still possible to modify the technical solution recorded in the previous embodiments or perform equivalent replacements on some or all of the technical features thereof, and these modifications or replacements do not make the essence of the corresponding technical solutions deviate from the technical solution of the embodiments of the present disclosure.

The present disclosure relates to the technical field of experimental apparatuses, in particular, to a test platform for the automatic flushing valve. The driplines are evenly arranged in an array in a circumferential direction, and emitters are installed on each of the driplines; one ends of the driplines are fixed to the diverter, the diverter is connected to the fluid source to feed fluid into the driplines through the diverter, the diverter is pivotally connected to the bracket, so that the diverter and the driplines can be driven by a constant speed motor to pivot relative to the bracket at a constant speed; the other ends of the driplines are used to install automatic flushing valves; and the first weighing parts are used to be installed below the automatic flushing valves to monitor a mass of a solution flowing out of the automatic flushing valves, and the second weighing parts are installed below the driplines to monitor a mass of a solution flowing out of the emitters. The present disclosure provides a test platform for the automatic flushing valve in view of the inability of the existing test apparatuses to test a hydraulic performance of automatic flushing valves and to evaluate an effect of the automatic flushing valves on an anti-clogging performance of emitters.

What is claimed is:

1. A test platform for testing at least one automatic flushing valve, comprising: a fluid source, a plurality of first weighing parts, a plurality of second weighing parts, a bracket, a diverter, and a plurality of driplines, wherein
    the driplines are parallel to each other and the driplines are evenly arranged in an array in a circumferential direction of the diverter;
    a plurality of emitters are provided on each of the driplines;
    one end of each of the driplines is fixed to the diverter;
    the diverter is connected to the fluid source to feed a solution into the driplines through the diverter, the emitters allow the solution to flow out of corresponding driplines;
    the diverter is pivotally supported by to the bracket, so that the diverter and the driplines can pivot relative to the bracket;
    the other end of each of the driplines is configured to install the automatic flushing valve; and
    each of the plurality of first weighing parts is provided below each of the other ends of the driplines to which the at least one automatic flushing valve is to be installed to monitor a mass of the solution flowing out of the corresponding automatic flushing valve that is installed; and
    the plurality of second weighing parts are installed below the driplines to monitor a mass of the solution flowing out of the emitters.

2. The test platform according to claim 1, further comprising: a horizontal centrifugal pump and a return tank, the return tank is configured to receive the solution flowing out of the emitters, the fluid source comprises a water storage tank, the water storage tank and the return tank are connected through the horizontal centrifugal pump to feed the solution in the return tank into the water storage tank through the horizontal centrifugal pump.

3. The test platform according to claim 2, further comprising: a water replenishment solution tank, a sand replenishment solution tank and a mixer, the mixer is installed in the water storage tank to stir the solution in the water storage tank, and both the sand replenishment solution tank and the water replenishment solution tank are communicated with the water storage tank.

4. The test platform according to claim 3, wherein the sand replenishment solution tank and the water storage tank are connected through a sand replenishment pipeline, the water replenishment solution tank and the water storage tank are connected through a water replenishment pipeline, the water replenishment pipeline and the sand replenishment pipeline are respectively equipped with a water replenishment solenoid valve and a sand replenishment solenoid valve, and both the water replenishment solenoid valve and the sand replenishment solenoid valve are electrically connected to a computer.

5. The test platform according to claim 3, further comprising a turbidity meter connected in communication with a computer, and the turbidity meter is fixedly installed on an inner wall of the water storage tank to monitor a sediment concentration of each layer in the water storage tank in real time.

6. The test platform according to claim 1, further comprising a timer connected in communication with a computer, and the first weighing parts are weighting sensors connected in communication with the computer.

7. The test platform according to claim 1, further comprising a connecting rod and a first support ring, the connecting rod is arranged parallel to the driplines, the driplines are evenly distributed around the connecting rod, the first support ring is sleeved and fixed on the connecting rod, the driplines are fixed to the connecting rod through the first support ring, and one end of the connecting rod is fixedly connected to a center point of the diverter.

8. The test platform valve according to claim 7, wherein the bracket further comprises a second support ring, at least one valve loader and a support rod, wherein the second support ring is sleeved on the connecting rod, the at least one valve loader is installed on the second support ring, each valve loader is arranged to sleeve on the corresponding automatic flushing valve to be installed, and a pipeline for feeding the solution to a corresponding one of the plurality of first weighing parts is installed on each valve loader.

9. The test platform according to claim 7, wherein the bracket further comprises a second support ring, a support rod, at least one valve loader, and at least one liquid collection bottle, wherein the second support ring is sleeved on the connecting rod, the at least one valve loader is installed on the second support ring, and each valve loader is arranged to sleeve on the corresponding automatic flushing valve to be installed, and each liquid collection bottle is installed on each corresponding valve loader.

10. The test platform according to claim 9, wherein each of the plurality of first weighing parts is installed in the corresponding liquid collection bottle to monitor a flush water volume and a flush duration; and/or, a sound sensor is installed on the second support ring, and the sound sensor is connected in communication with a computer to monitor and record a start time point and an end time point of a water spray sound when the automatic flushing valve flushes, then calculate a flush duration.

* * * * *